Jan. 28, 1969 R. J. ERDMAN 3,424,981

LOW LEVEL D.C. VOLTAGE APPARATUS EMPLOYING A BALANCED MODULATOR AND FILTER MEANS TO REMOVE SPURIOUS SIGNALS

Filed Nov. 12, 1964

INVENTOR.
ROBERT J. ERDMAN
BY Williams, David Hoffmann & Yount
ATTORNEYS

United States Patent Office 3,424,981

Patented Jan. 28, 1969

3,424,981

LOW LEVEL D.C. VOLTAGE APPARATUS EMPLOYING A BALANCED MODULATOR AND FILTER MEANS TO REMOVE SPURIOUS SIGNALS

Robert J. Erdman, Cleveland, Ohio, assignor to Keithley Instruments, Inc., Cleveland, Ohio, a corporation of Ohio Filed Nov. 12, 1964, Ser. No. 410,803
U.S. Cl. 324—118 2 Claims
Int. Cl. G01r *19/18*

ABSTRACT OF THE DISCLOSURE

In the present system and method a low level (nanovolt) D.C. voltage is applied without filtering to a mechanical chopper to amplitude modulate a 94 c.p.s. carrier signal. The modulated signal output from the chopper includes only the carrier and the sum and difference frequencies of the carrier and the spurious 60 c.p.s. power frequency signal which may accompany the D.C. input signal. After being pre-amplified, the modulated signal is passed through side band filters which bypass the sum and difference frequencies to ground. After further amplification the carrier signal frequency component of the modulated signal is demodulated in a synchronous demodulater, and the recovered D.C. signal is measured by a meter.

This invention relates to amplification of D.C. (direct current) electrical signals from a low level, such as the nanovolt level, to a level suitable for operating indicating meters and the like, and more particularly to the elimination of spurious signals such as the common 60 cycle line frequency signal.

While it is known that tuned input filters can be used to reject spurious signals of predetermined frequencies if the voltage level of the D.C. signal source is high enough, for extremely small D.C. voltages, such as the nanovolt level, input filters are unsatisfactory because of noise generated within the filter itself.

Accordingly, as a primary object this invention aims to provide an improved system for amplifying extremely low level D.C. voltage signals and eliminating spurious signals of a known frequency and without introducing other spurious signals of any significance.

Another object of the invention is the provision of such an improved system comprising means for converting the D.C. input signals to an A.C. (alternating current) signal the amplitude of which varies with the D.C. input signal, the A.C signal comprising a carrier frequency different from the frequency of the spurious signal to be eliminated and sideband frequencies corresponding to the sum and difference of the spurious signal frequency and the carrier signal frequency, the system further comprising AC. amplifier means for amplifying the A.C. signal, and sideband filter means connected to the output of the A.C. amplifier means and operative to reject the sideband frequencies and to pass the carrier signal frequency to demodulating means which provides a D.C. output corresponding to the amplitude of the carrier signal and to the original D.C. input signal.

Yet another object of the invention is the provision of an amplifying system of the foregoing character wherein the A.C. amplifying means comprises a pre-amplifier section the output of which is passed through the sideband filter to a secondary A.C. amplifier section prior to demodulation and further amplification. In a preferred embodiment the sideband filter comprises a first series connected LC (inductance and capacitance) circuit connected across the output of the pre-amplifier section and resonant at one sideband frequency to be rejected, a second series connected LC circuit connected across the preamplifier output and resonant at the other sideband frequency to be rejected, and a parallel connected resistance and capacitance circuit providing for minimum phase shift of the carrier frequency.

Figure 1:
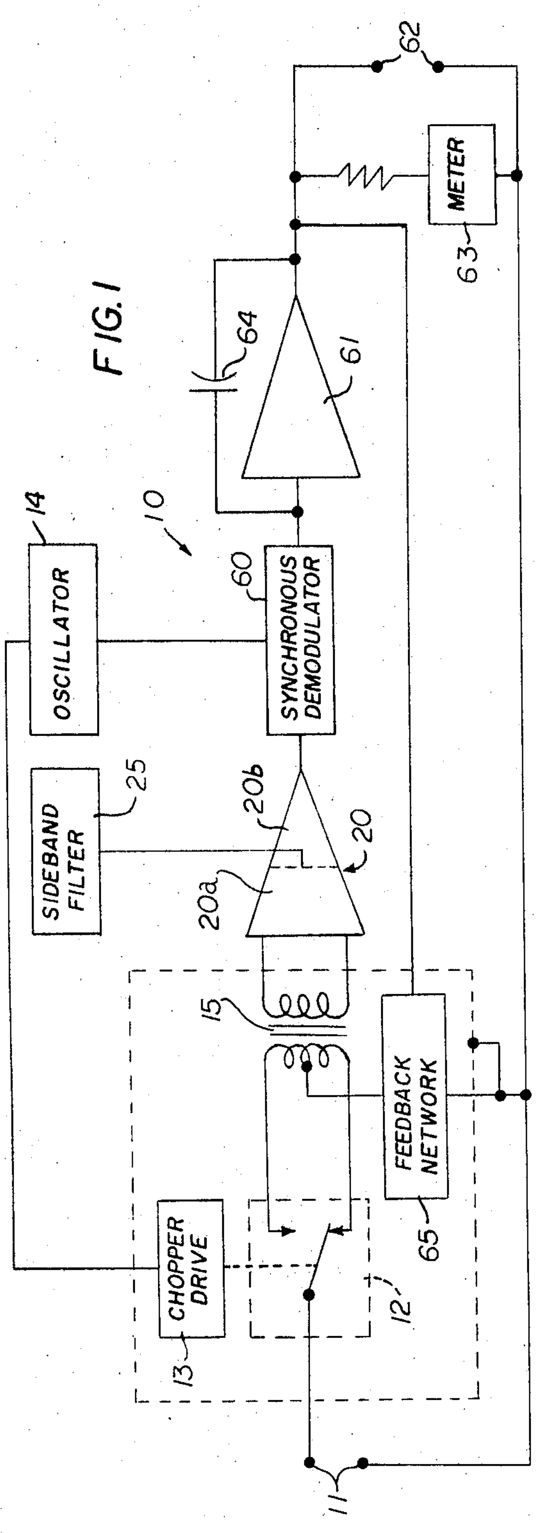
Figure 2:
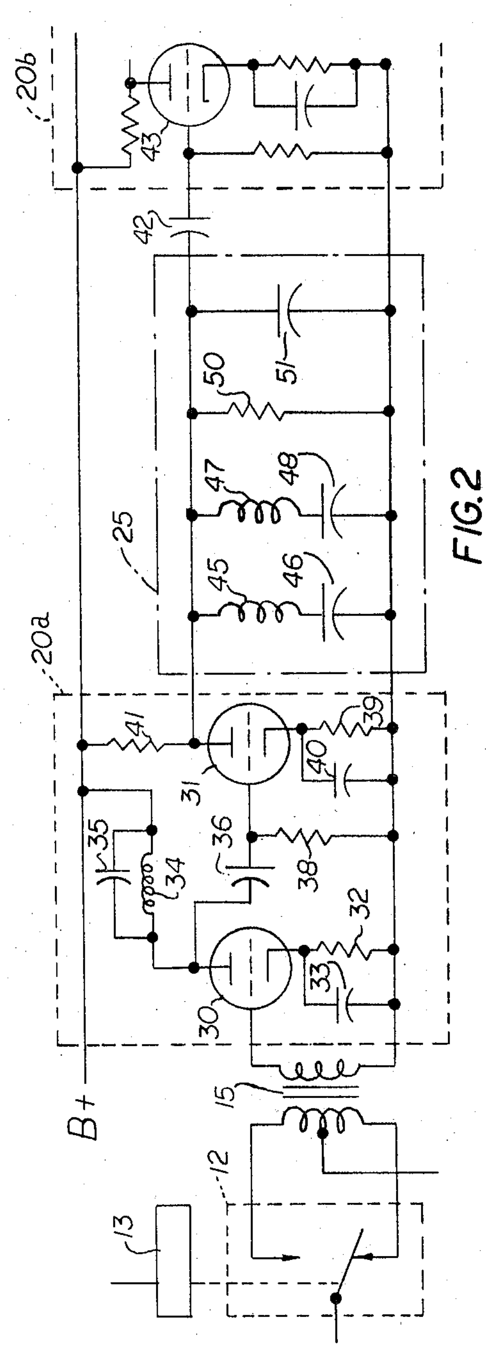

Other objects and advantages of the amplifying system of this invention will become apparent from the following detailed description of a preferred embodiment thereof read in conjunction with the accompanying sheet of drawings, forming a part of this specification, and in which:

FIG. 1 is a block diagram of a nanovolt amplification and/or measuring system embodying the present invention; and FIG. 2 is a schematic diagram of a portion of the system of FIG. 1.

In the form of the invention illustrated in the drawings and described hereinafter there is provided an amplification and/or measuring system, generally indicated at 10, suitable for use in amplifying and/or measuring small D.C. voltages on the order of the nanovolt level from low impedance sources, while eliminating spurious A.C. signals of a known frequency. By way of example, the system 10 will be described with reference to the elimination of the common 60 cycle A.C. line frequency as a spurious signal.

The amplification system 10 is provided with input terminals 11 for connection to a source of D.C. voltage to be amplified or measured. The D.C. input signal is converted by mechanical chopper means 12 to an A.C. signal the amplitude of which varies with the D.C. input signal. This A.C. signal comprises a carrier frequency determined by the frequency at which the chopper means is operated by chopper drive means 13, which is in turn controlled by a suitable oscillator 14 In the present example, the chopper means 12 is driven so as to provide an A.C. carrier of 94 cycles per second.

In the event the D.C. input voltage has impressed thereon a spurious A.C. signal such as the mentioned common 60 cycle line voltage signal, the A.C. output of the chopper means 12 will comprise not only the 94 cycles per second carrier frequency, but also sideband frequencies equal to the sum and the difference between the carrier frequency and the spurious signal frequency. Accordingly, in the present example the A.C. output signal of the mechanical chopper means 12 would comprise a carrier frequency of 94 cycles per second, a first sideband frequency of 34 cycles per second and a second sideband frequency of 154 cycles per second.

The A.C. output of the mechanical chopper means 12 is applied by suitable inductive coupling means 15 to the input side of A.C. amplifier means generally indicated at 20 and comprising a pre-amplifier section **20*a* and a secondary amplifier section 20*b*. The A.C. output of the mechanical chopper means 12, including the carrier frequency and any sideband frequencies, is amplified by the pre-amplifier section 20*a*, the output of which is applied to sideband filter means 25**.

Referring now to FIG. 2, the pre-amplifier section **20*a* comprises a two stage vacuum tube amplifying means including a first triode 30 and a second triode 31. The A.C. output of the chopper means 12 is applied by the inductive coupling means 15 to the grid of the triode 30 which is appropriately biased as by cathode resistor 32 having a by-pass capacitor 33 which presents a relatively low reactance to the 94 cycle per second carrier frequency. The triode 30 is further provided with a tuned plate circuit including a suitable inductor 34 and a tuning capacitor 35 so that the triode 30** provides a relatively narrow bandpass characteristic for the carrier frequency.

The triode 30 is coupled by means of a blocking condenser 36 to the control grid of the triode 31 which is provided with a suitable grid resistor 38, cathode biasing resistor 39, and carrier frequency by-pass capacitor 40.

The plate of the triode 31 is supplied with the appropriate plate voltage through load resistor 41, and the amplifier A.C. output of the pre-amplifier section 20*a* is applied through the sideband filter 25 and a suitable blocking capacitor 42 to the grid of the first stage tube 43 of the subsequent amplifier section 20*b*.

The sideband filter 25 comprises a choke 45 connected in series with a capacitor 46 across the pre-amplifier output to provide a first series connected LC circuit which is resonant at one of the sideband frequencies so as to reject that sideband frequency from passage to the blocking capacitor 42 and subsequent amplifier section. A second choke 47 is connected in series with a capacitor 48 across the pre-amplifier output to provide a second series connected LC circuit which is resonant at the other of the sideband frequencies. The choke 47 and capacitor 48 are thereby operative to reject that sideband frequency prior to application of the amplified A.C. signal to the blocking capacitor 42 and subsequent amplification section.

The filter 25 further comprises a resistance 50 and a capacitor 51 connected in parallel across the output of the preamplifier section and prior to the blocking capacitor 42, the resistor 50 and capacitor 51 being selected to cause the filter 25 to pass with minimum phase shift the A.C. output of the implifier section at the carrier frequency of 94 cycles per second.

In the present example where the spurious signal sought to be iliminated is 60 cycles per second, the choke 45 advantageously has a value of 80 henrys and the capacitor 46 of .0135 microfarad so as to reject the sideband frequency of 154 cycles per second, while of the choke 47 is advantageously of 120 henrys and the capacitor 48 of .184 microfarad so as to reject the sideband frequency of 34 cycles per second.

Reverting to FIG. 1, the output of the filter 25 is applied through the blocking capacitor 42 to the secondary amplifier section 20*b* where it is amplified to provide an amplified A.C. signal, the amplitude of which varies in accordance with the original D.C. input signal. The output of the secondary amplifier section 20*b* is applied to the input of a synchronous demodulator 60 which is driven by the oscillator 14 in synchronism with the chopper means 12 to provide a demodulated output in the form of a D.C. signal the amplitude of which corresponds with the envelope of the amplified A.C. output of the amplifier means 20.

The output of the demodulator 60 is preferably applied to a D.C. amplifier 61 within it is further amplified to provide the necessary power at output terminals 62 for the desired use such as operating a meter 63 which may be suitably calibrated to indicate the D.C. voltage input at terminals 11. A smoothing capacitor 64 is prefarebly connected across the D.C. amplifier 61 to effectively reduce ripple in the output thereof.

The amplifier system 10 may be conveniently provided with a feedback network 65 interposed between the output of the D.C. amplifier 61 and the inductive coupling 15, and which may be adjusted to select the voltage range of operation.

It is important that the carrier frequency produced by the chopper means 12 be different from the frequency of the spurious signal to be eliminated and such that the sideband frequencies resulting from the spurious and carrier frequency will have no combinations which equal or substantially equal the carrier frequency, otherwise a frequency would result from the sideband frequencies or the combination thereof which would be passed by the filter formed by the inductor 34 and capacitor 35 and the spurious signal would not be effectively eliminated. Thus, in the present example where the spurious signal frequency sought to be eliminated is 60 cycles per second, a carrier frequency of 94 cycles per second was selected which will produce sideband frequencies of 34 and 154 cycles which will combine to provide frequencies of 120 cycles per second or 188 cycles per second, none of which frequencies equal or approximate the selected carrier frequency of 94 cycles per second. Accordingly the amplified output of the system 10 utilizing the filter 25 will be remarkably free of output errors due to spurious input signals on the order of 60 cycles per second. Moreover, any random or thermal agitation noises developed within the filter means 25 itself will be notably insignificant with respect to the level of voltages being passed by the filter.

From the foregoing detailed description it will be recognized that the invention has provided a particularly effective and novel system for amplifying low level D.C. voltage signals and eliminating spurious signals of a predetermined frequency from the output thereof. Of course, the described embodiment was given by way of example and certain changes, substitutions, or modifications will be apparent to those skilled in the art to which the invention pertains. For example, a transistor amplification system and various other types of demodulators may be substituted for the arrangements shown. Accordingly, although the invention is described in considerable detail with reference to a specific amplification system embodying the invention, it will be understood that the invention is not limited thereto, but rather the invention includes all those modifications, adaptations, substitutions, and uses as are reasonably embraced by the scope of the claims hereof.

Having described my invention, I claim:

1. A system for measuring a low level D.C. voltage component of an unfiltered input signal which may also have a spurious A.C. component of a known frequency comprising:

balanced modulator means for amplitude modulating an A.C. carrier signal of a predetermined frequency directly with said unfiltered input signal to produce a modulated signal whose frequency components include only the carrier signal frequency and the sum and difference frequencies of said carrier signal and said spurious A.C. component of the unfiltered input signal, said predetermined frequency of the carrier signal being substantially different from that of said spurious A.C. component of the unfiltered input signal and from each of said sum and difference frequencies and from sum and difference combinations of said sum and difference frequencies;

means for amplifying said modulated signal;

side band filters connected to the output of said amplifying means and tuned respectively to bypass said sum and difference frequencies and to pass only said carrier signal frequency component of the modulated signal;

demodulator means coupled to the output of said filters and synchronized with said modulator means for synchronously demodulating said carrier signal frequency component of the modulated signal to provide an amplified D.C. replica of said low level D.C. voltage component of the unfiltered input signal;

and D.C. signal measuring means coupled to the output of said demodulating means.

2. A system for measuring a low level D.C. voltage component of an unfiltered input signal which may also have a spurious A.C. component of a known frequency comprising:

a balanced modulator comprising mechanical chopper means driven at a predetermined carrier signal frequency and means for applying said unfiltered input signal directly to said chopper means without filtering said input signal to produce an amplitude modulated signal output from said chopper means whose frequency components include only the carrier signal frequency and the sum and difference frequencies of said carrier signal and said spurious A.C. component of the unfiltered input signal, said predetermined carrier frequency at which said chopper means is driven being substantially different from the frequency of said spurious A.C. component of the unfiltered input signal and from each of said sum and difference frequencies and from sum and difference combinations of said sum and difference frequencies;

means for amplifying said modulated signal output from said chopper means;

side band filters connected between the output of said amplifying means and ground, said side band filters being tuned respectively to said sum and difference frequencies for bypassing the latter to ground and for passing only said carrier signal frequency component of the modulated signal;

additional amplifier means connected to the output of said filters for further amplifying said carrier signal frequency component of the modulated signal;

a demodulator synchronized with said modulator and connected to the output of said additional amplifier means for synchronously demodulating said carrier signal frequency component of the modulated signal to provide an amplified D.C. replica of said low level D.C. voltage component of the unfiltered input signal;

and D.C. signal measuring means coupled to the output of said demodulating means.

References Cited

UNITED STATES PATENTS

| | | | |
|---|---|---|---|
| 3,173,096 | 3/1965 | Hinrichs et al. ---- | 330—10 XR |
| 2,297,543 | 9/1942 | Eberhardt et al. -- | 324—118 XR |
| 2,372,062 | 3/1945 | Dorsman ----------- | 324—118 |
| 2,942,188 | 6/1960 | Mitchell ------------ | 324—118 |
| 3,101,446 | 8/1963 | Glomb et al. -------- | 324—118 |

OTHER REFERENCES

Hewlett-Packard Journal, vol. 10; No. 11–12; July-August 1959; pp. 1 through 4.

RUDOLPH V. ROLINEC, *Primary Examiner.*

E. F. KARLSEN, *Assistant Examiner.*

U.S. Cl. X.R.

330—10